Patented Nov. 17, 1942

2,302,159

UNITED STATES PATENT OFFICE 2,302,159

INSECT REPELLENT

Ludwig W. Wasum, Manoa, Pa., assignor, by mesne assignments, to Kessler Chemical Co., Inc., Philadelphia, Pa., a corporation of Pennsylvania No Drawing. Application November 16, 1939, Serial No. 304,703

3 Claims. (Cl. 167—30)

This invention relates to insect repellents and more particularly to insect repellents which in various forms will be highly effective and, at the same time, may be applied to the skin without any harmful result.

The insect repellents according to this invention may be prepared in various forms, as solutions, pastes, emulsions, and the like, or they may be used direct, and they may be combined with an insecticide, if desired. They will be found highly efficient in repelling flies, greenheads, mosquitoes, and insects generally and lend themselves to application to man and animals.

The repellents according to this invention, aside from their efficacy for the purpose intended, are characterized by the fact that they do not have the strong, unpleasant odor of repellents, such as citronella, pine oil, and the like, and do not produce the smarting effect when applied to the skin, particularly tender or sunburned skin, which is produced by repellents such as some of the essential oils and synthetic aromatic compounds, for example, benzoic, salicylic, phthalic, etc. acid esters.

As has been indicated, the repellents may be applied direct or in the form of a solution or lotion, a paste or cream, an emulsion, or the like.

The insect repellents according to this invention comprise from the broad standpoint aliphatic, substituted aliphatic and heterocyclic acid esters of cyclohexanol and substituted cyclohexanols. More specifically the esters may be diluted with a solvent or emulsified with water and may be combined with an insecticide.

The esters comprising the insect repellents according to this invention may be produced by esterifying cyclohexanol or a substituted cyclohexanol with an aliphatic or substituted aliphatic acid or heterocyclic acid, following any well known procedure for effecting esterification.

By way of example, the esters may be produced by esterifying cyclohexanol, or a substituted cyclohexanol, with a saturated or unsaturated fatty acid, for example, caproic, caprylic, capric, myristic, lauric, stearic, oleic, linoleic, ricinoleic, etc. acid, or with a substituted aliphatic acid, for example, lactic acid, or with a heterocyclic acid, for example, furoic acid.

The esters comprising the insect repellents according to this invention may be applied direct, but desirably will be applied in the form of a spray, lotion or cream by the addition of a solvent, or by emulsification.

For the formation of a solution for use as a spray or lotion any suitable solvent, for example, alcohol, a mineral oil, a vegetable oil, or the like, for the esters may be used. Thus, for example, insect repellent lotions for application to the skin may be made up on the following formulae:

Formula A

| | Parts |
|---|---|
| Methyl cyclohexyl caprate | 10–25 |
| Alcohol (ethyl, isopropyl) | 75–90 |

Formula B

| | Parts |
|---|---|
| Cyclohexyl stearate | 10–25 |
| Oil (white neutral mineral oil, olive oil) | 75–90 |

As further illustrative, a spray, adapted for the spraying of cattle and including an insecticide, may be made up on the following formula:

Formula C

| | Parts |
|---|---|
| Cyclohexyl furoate | 75–90 |
| Mineral oil, 80–85 Saybolt viscosity at 100° F., containing active principles from .25– 2.0 lbs. of pyrethrum flowers | 10–25 |

When it is desired to include an insecticide, as in the above formula C, the active principles of pyrethrum flowers, derris, cube, and the like, may be used.

As further illustrative, an insect repellent cream for application to the skin may be made up on the following formula:

Formula D

| | Parts |
|---|---|
| Cyclohexyl caprate | 25.0 |
| Stearic acid | 20.0 |
| Potassium hydroxide | .67 |
| Water | 54.33 |

To form the cream the ingredients according to the above Formula D are emulsified by any well known procedure.

As exemplifying the efficacy of the insect repellent, according to this invention, for example, 12 small fish which were in the early stages of decay were sprayed with a lotion containing 3% of cyclohexyl furoate and were compared with 12 fish in a similar state of decay in the presence of blow flies. It was noted that while blow flies to the number of from 2 to 50 centered on every one of the untreated fish, the flies stayed away from the treated fish for more than two hours.

Again, fly bait was placed in two Petri dishes and the bait in one of the dishes was lightly sprayed with a solution of 25% cyclohexyl caprate in isopropyl alcohol, while the bait in the other dish was sprayed with isopropyl alcohol alone. After standing for two hours the dishes were placed in a fly cage containing 500–700 house flies which had been starved for twelve hours. It was found that during a period of three hours 30–50 flies always were eating the bait which had been sprayed with isopropyy alcohol alone, while during the entire period only two flies landed on the bait sprayed with cyclohexyl caprate solution.

It will be understood that where in the claims appended hereto the terms "cyclohexanol" and "cyclohexyl" are used, it is intended that those terms shall be construed as including substituted cyclohexanols, and that where the term "aliphatic acid" is used that that term shall be construed to include substituted aliphatic acids.

What I claim and desire to protect by Letters Patent is:

1. An insect repellent comprising cyclohexyl caprate.

2. An insect repellent comprising cyclohexyl caprate dissolved in a solvent.

3. An insect repellent comprising cyclohexyl caprate emulsified with water.

LUDWIG W. WASUM.